Aug. 17, 1954  D. C. BETTISON  2,686,668
HYDRAULIC RETARDER RAIL, SPRING SWITCH, AND SPRING FROG
Filed March 4, 1953

David C. Bettison
INVENTOR.

BY
Mann, Brown and Hansmann
Attorneys

Patented Aug. 17, 1954

2,686,668

UNITED STATES PATENT OFFICE 2,686,668

HYDRAULIC RETARDER RAIL, SPRING SWITCH, AND SPRING FROG

David C. Bettison, Omaha, Nebr.

Application March 4, 1953, Serial No. 340,202

3 Claims. (Cl. 267—1)

This invention relates to hydraulic retarders used for cushioning movement of the switch point in a spring switch or return movement of the spring rail of spring frogs. Devices of this kind are well-known and a general description of their construction, installation and operation may be found in the 1948 issue of "Railway Engineering and Maintenance Cyclopedia" published by Simmons-Boardman Publishing Corporation of Chicago at pages 402, and 412 to 414, inclusive.

More specifically, the present invention is directed to the problem of preventing oil losses in the hydraulic retarder used in these installations, since the loss of too much oil from the retarder can render them ineffectual and inoperative.

The principal object of the invention, therefore, is to provide a simple means whereby oil that tends to leak past the piston sealing gland is automatically returned to the oil reservoir of the hydraulic retarder so that it cannot escape from the device.

Other objects and advantages will become apparent as the disclosure proceeds and the description is read in conjunction with the accompanying drawings, in which Figure 1 is a longitudinal sectional view through a hydraulic retarder that is equipped with the oil return device of this invention;

For the purpose of disclosure, it has been found convenient to describe the invention as applied to the hydraulic retarding device manufactured by the Pettibone Mulliken Corporation of Chicago, Illinois, and which is illustrated and described on pages 413 and 414 of the "Railway Engineering and Maintenance Cyclopedia" previously identified, but it will be understood that the invention is applicable to other types of retarders used for spring frogs as well as retarders that are commonly used with spring switches, and the appended claims should be construed as broadly as the prior art will permit.

Figure 3:
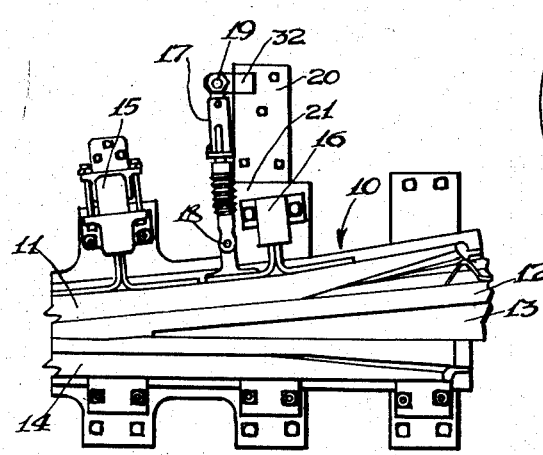
Figure 3 is a plan view showing the manner in which the retarder is conventionally installed for use with spring frogs.
Figure 2:
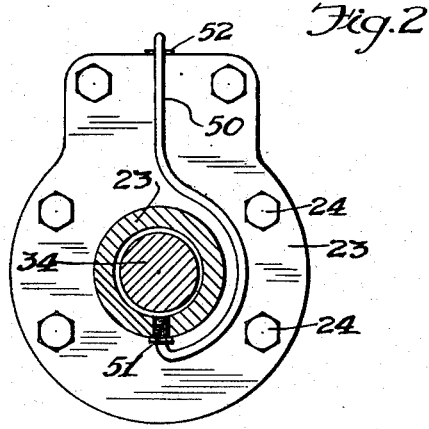
Figure 2 is a vertical sectional view taken on line 2—2 of Figure 1.

Referring first to Figure 3, a spring frog, generally designated 10, is shown which has a spring wing rail 11, a long point rail 12, a short point rail 13, and a rigid wing rail 14. The spring box for the spring wing rail is shown at 15 and a hold down at 16, as is conventional, and the hydraulic retarder for the spring wing rail is indicated at 17. As will be seen, the front end of the retarder is connected at 18 to the spring wing rail, and the back end is anchored at 19 to an extension plate 20 which is rigidly anchored as by welding to the frog plate 21.

Figure 1:
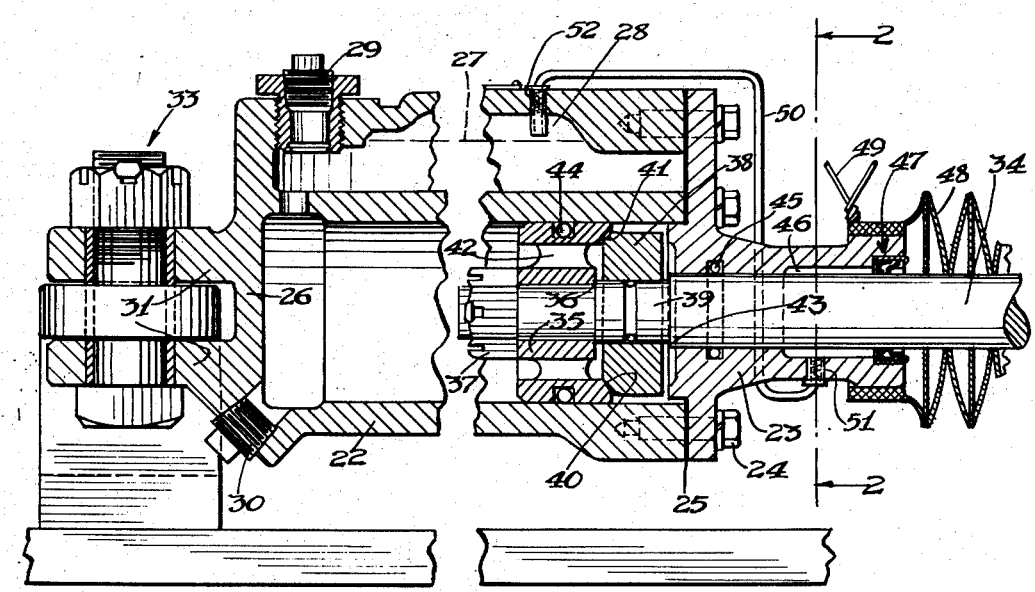

Referring now to Figure 1, the retarder comprises a cylinder body 22 provided with a front cap 23 secured to the cylinder body by bolts 24 with a gasket 25 interposed between the cap and the body. The cylinder body is closed at the rear end by a wall 26, and the cylinder is filled with oil to a level indicated by the dotted line 27. The space above the oil in the cylinder constitutes an air dome 28 as will hereinafter be explained. Access to the cylinder for filling it with oil is through a plug 29, which is tightly fitted into place so that it hermetically seals the air dome, and a similar plug 30 is located at the bottom of the cylinder for draining the cylinder of oil. It will be understood, of course, that the retarder is always mounted in a horizontal position as shown in Figure 3.

The rear end of the cylinder body 22 is bifurcated as indicated at 31, and the bracket 32 which supports the rear end of the retarder is anchored to the retarder by the bolt and nut indicated at 33.

The connection between the retarder and the spring wing rail 11 is through the intermediary of a piston rod 34 which passes through the front cap 23 and carries a piston head 35 on its inner end. The piston rod is stepped as indicated at 36 to form a shoulder against which the piston head 35 bears and it is locked in place by a nut 37.

Immediately adjacent to the piston head 35 is a sliding valve member 38 which is mounted on another stepped portion 39 of the piston rod and upon which the valve is free to move within predetermined limits. Its movement to the left in Figure 1 is limited by the valve 38 striking the rear face of the piston head as indicated at 40, although a small opening 41 of predetermined size is provided to restrict the flow of oil from the right side of the piston head to the left side through openings 42 in the piston head when the piston rod is moving to the right in Figure 1.

Movement of the valve 38 to the right on the stepped portion 39 is, of course, limited by the shoulder 43 on the piston rod.

It will, therefore, be seen that as the piston rod moves to the left, oil can freely flow through the openings 42 and past the valve 38, since valve 38 will, under such circumstances, move against the shoulder 43 and provide an unimpeded flow of oil from the left side of the piston head to the right side, but when the piston rod starts its return movement to the right, the valve 38 immediately goes to its seat on the rear face of the piston head 35 and the flow of oil from the right side of the piston head to the left side is restricted to the oil that can pass through the small opening 41, thereby retarding movement of the piston rod to the right.

It will be understood that springs in the spring housing 15 bias the spring wing rail 11 to closed position, and whenever a wheel flange passes through the spring frog, the piston rod 34 is moved sharply to the left against the compression of the spring in the housing 15, and as soon as the wheel flange leaves the frog, the spring in the housing 15 urges the spring wing rail to closed position, subject to the action of the retarder.

The relatively high pressures within the oil cylinder 22 requires adequate sealing of the piston head 35 and of the piston rod 34 and accordingly the piston head 35 and piston rod 34 are provided with O-rings 44 and 45 respectively. However, experience has taught that some leakage does occur past the piston rod sealing ring 45 and for that reason a concentric chamber 46 is provided outboard of the rod bearing at the front end of the cap 23 with the front end of the chamber being closed by a packing gland generally designated 47. The packing gland 47, however, is little more than a dust shield and its action is augmented by a flexible bellows 48 suitably secured to the outer periphery of the cap 23 as indicated at 49.

Even with all of these seals it has been found that oil frequently leaks past the packing gland 47 and escapes from the housing and obviously when sufficient oil has leaked from the cylinder 22, the entire retarder becomes inoperative. My invention provides a means whereby this difficulty is overcome and any oil that escapes from the cylinder 22 through the piston rod seal 45 is immediately returned to the air dome 28 to maintain the oil level within such dome.

This is accomplished by connecting the chamber 46 with the air dome 28 by a small tube 50 which is suitably fitted at one end into the lower part of the chamber 46 as indicated at 51 and which has its other end similarly fitted as at 52 into the air dome 28. The fittings 51 and 52 are airtight so that in effect the air dome 28 is connected through the tube 50 with the chamber 46 and thence to atmosphere inasmuch as the packing gland 47 and bellows 48 are not sufficiently hermetic to exclude atmosphere from the chamber 46.

Whenever a sufficient amount of oil leaks by the piston rod seal 45 to form a pool in the bottom of the chamber 46 and thereby cover the fitting 51, such a pool of oil will immediately be sucked into the air dome 28 through the tube 50 by reason of the drop in pressure in the air dome 28 whenever the piston rod 34 moves to the right. This is because movement of the piston to the right from its extended position within cylinder 22 increases the effective area of the cylinder 22 and thereby reduces the air pressure within the air dome 28, thereby sucking oil into the air dome from the chamber 46 whenever the piston rod 34 moves to the right. In a similar manner, when the piston rod moves to the left the displacement of the piston rod to the extent that it enters the cylinder body decreases the effective area of the cylinder and thereby increases the pressure in the air dome 28 which is relieved through the tube 50, chamber 46 and through the packing gland 47 to atmosphere. In this manner the working of the piston is used to pump oil from the chamber 46 back into the air dome 28 and the escape of oil from the cylinder is thereby prevented.

It may be remarked that when the piston rod moves to the left and thereby increases the pressure in air dome 28, any blowing of air through the tube 50 to atmosphere will not carry oil with it even though there may be some oil in the chamber 46 since the packing gland 47 is effective in preventing oil from passing outwardly through the gland even though it is not an hermetic seal. However, since each stroke of the piston to the right automatically transfers any oil in the chamber 46 to the dome 28, the accumulation of oil within the chamber 46 is relatively small and hence the problem is not serious.

It will be understood that my invention can be variously embodied with the scope of the appended claims and I intend to cover such modifications that are within the skill of the ordinary mechanic familiar with this art.

I claim:

1. In a retarder of the class described, the combination of a horizontal cylinder closed at one end and having an oil reservoir above and in free communication with said cylinder to continuously keep the cylinder filled with oil, an air dome above the oil reservoir, a piston extending into said cylinder through a bearing at the other end of the cylinder, a head on the piston having means associated therewith for restraining the flow of oil from one side of the head to the other during at least one direction of movement of the piston, sealing means associated with the bearing, a fluid chamber around the piston outboard of said bearing and sealing means and in communication with the atmosphere, and a conduit connecting the lower portion of said chamber with said air dome for returning oil leaking thereinto through the said sealing means back to said reservoir by the subatmospheric pressure developed in said air dome during outward movement of the piston.

2. A retarder as set forth in claim 1 in which the restraining means associated with the piston head provides relatively free passage of oil from one side of the head to the other when the piston is moved in a direction opposite to said one direction.

3. A retarder as set forth in claim 1 in which said conduit extends into the air dome to a point just above the oil level of the reservoir.

References Cited in the file of this patent

UNITED STATES PATENTS

| Number | Name | Date |
|---|---|---|
| 1,689,841 | Powell | Oct. 30, 1928 |
| 1,966,310 | Padgett | July 10, 1934 |
| 2,233,227 | Ramey et al. | Feb. 25, 1941 |
| 2,282,652 | Henning | May 12, 1942 |
| 2,360,748 | Whistler et al. | Oct. 17, 1944 |